United States Patent
Surholt et al.

(10) Patent No.: US 7,369,910 B2
(45) Date of Patent: May 6, 2008

(54) METHOD FOR THE OPTIMIZING OF A PRODUCTION PROCESS

(75) Inventors: Dirk Surholt, Munich (DE); Christopher Plapp, Munich (DE)

(73) Assignee: Axxom Software AG, Munich (DE)

( * ) Notice: Subject to any disclaimer, the term of this patent is extended or adjusted under 35 U.S.C. 154(b) by 780 days.

(21) Appl. No.: 10/704,877

(22) Filed: Nov. 10, 2003

(65) Prior Publication Data

US 2005/0021164 A1    Jan. 27, 2005

(30) Foreign Application Priority Data

Nov. 11, 2002    (DE) ................. 102 52 294

(51) Int. Cl.
*G06F 19/00* (2006.01)
(52) U.S. Cl. .................. 700/99; 700/106; 700/103
(58) Field of Classification Search .................. 700/99, 700/100, 106, 103; 705/8
See application file for complete search history.

(56) References Cited

U.S. PATENT DOCUMENTS

| | | | |
|---|---|---|---|
| 5,615,109 A | * | 3/1997 | Eder .............................. 705/8 |
| 6,272,389 B1 | * | 8/2001 | Dietrich ...................... 700/101 |
| 2001/0004520 A1 | * | 6/2001 | Nomoto et al. ............. 434/109 |
| 2005/0096771 A1 | * | 5/2005 | Denton et al. .............. 700/103 |

OTHER PUBLICATIONS

Industrial Information Systems With accent on the decision supported systems, SS 2002, Version 6.0 (Summer 2002) (translated from German to English).

* cited by examiner

*Primary Examiner*—Leo Picard
*Assistant Examiner*—Steven R. Garland
(74) *Attorney, Agent, or Firm*—Dykema Gossett PLLC; Lisa V. Mueller

(57) ABSTRACT

The present invention relates to methods for optimizing a production process having starting products, intermediate products and at least one final product. The present invention also relates to a digital storage medium and a computer program product that can be used in connection with the methods of the present invention.

11 Claims, 12 Drawing Sheets

Flowchart for the method step of quant network generation on department (stage) level.

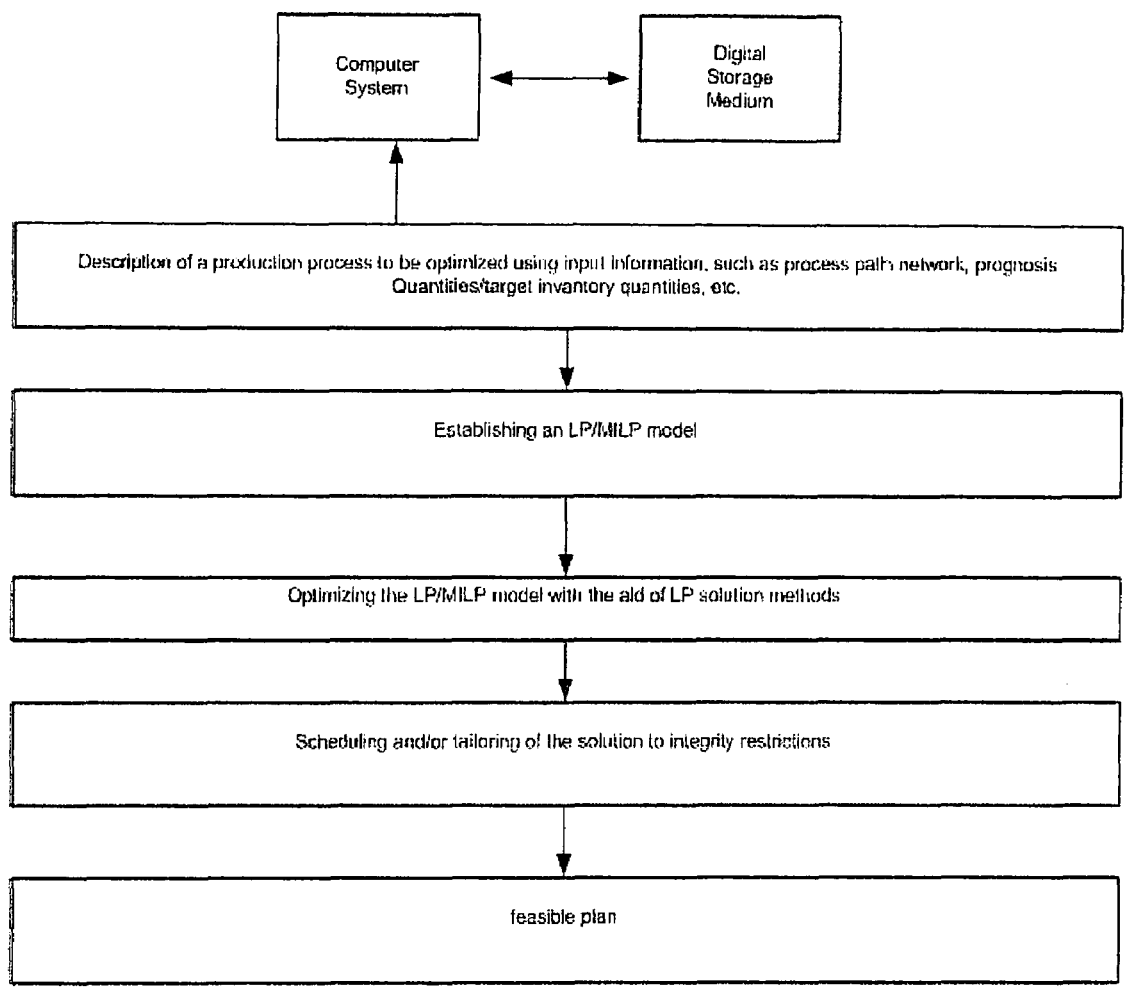
Fig. 1: Flowchart to illustrate the methods according to the related art

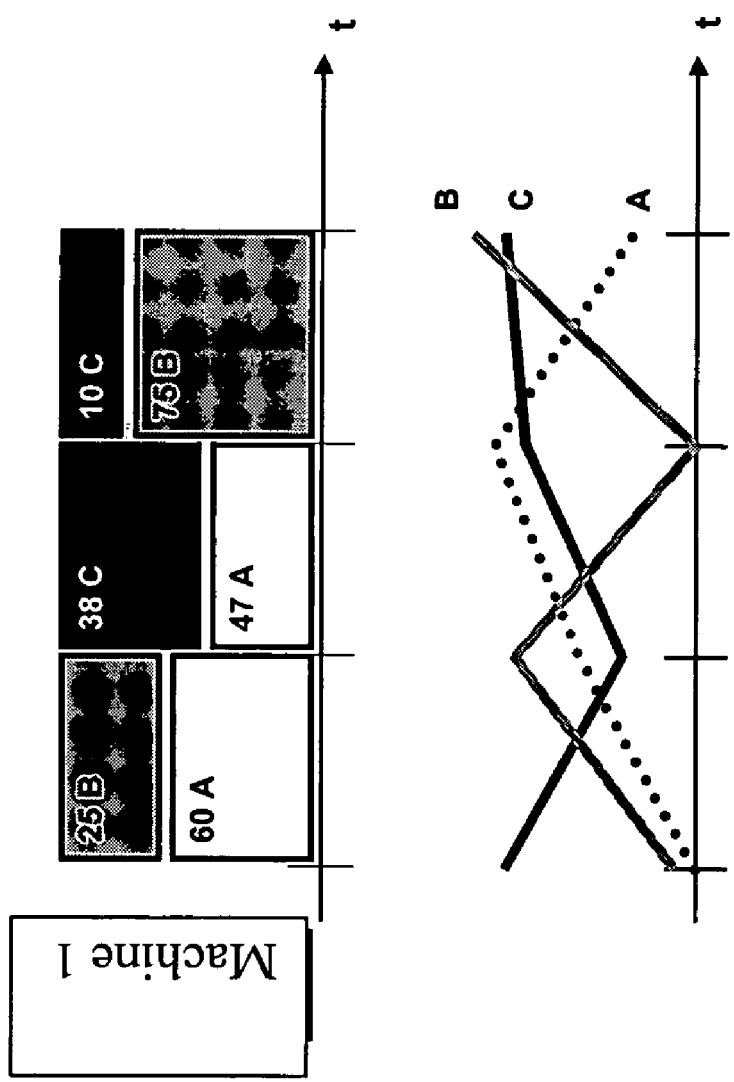
Fig. 1a: Capacity planning diagram, i. e. quantity planning in the planning period, with the LP sales (top), and inventory graphs resulting therefrom (bottom)

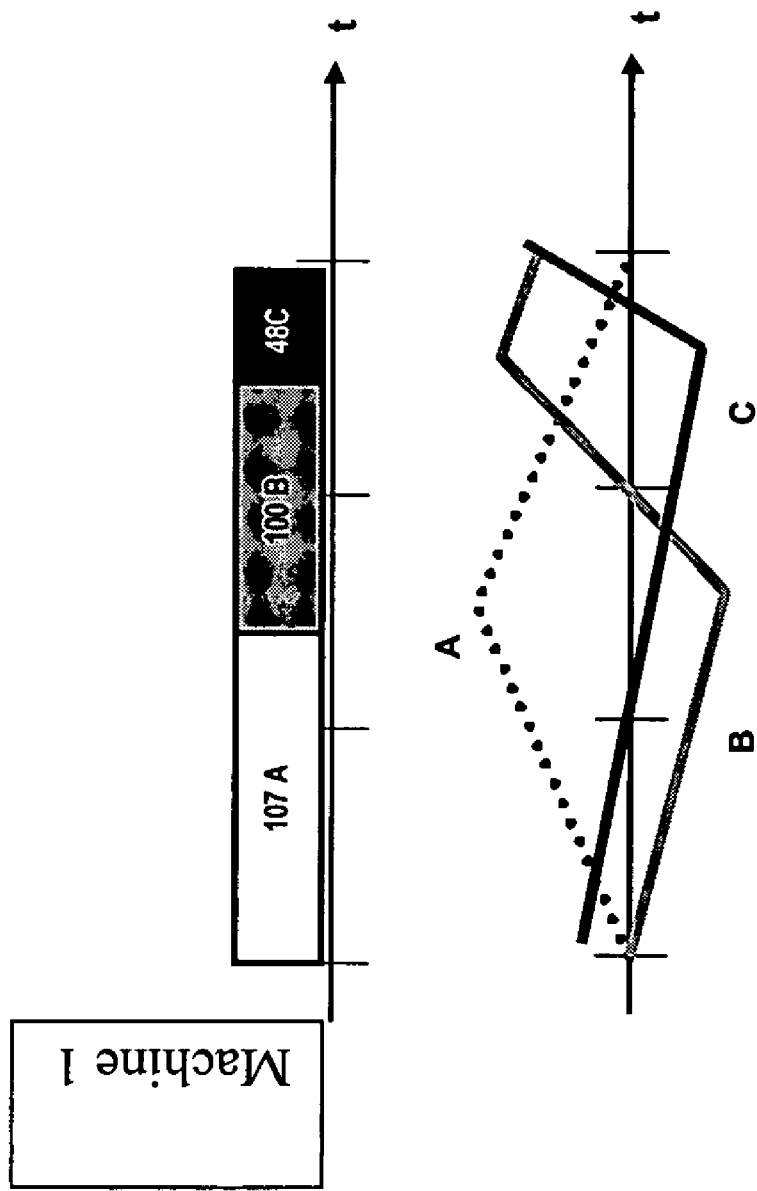
Fig. 1b: Sequence and campaign planning of the quantity plan of fig. 1a in regard to minimum setup and cleaning outlay (top), and impermissible inventory graphs resulting therefrom (bottom).

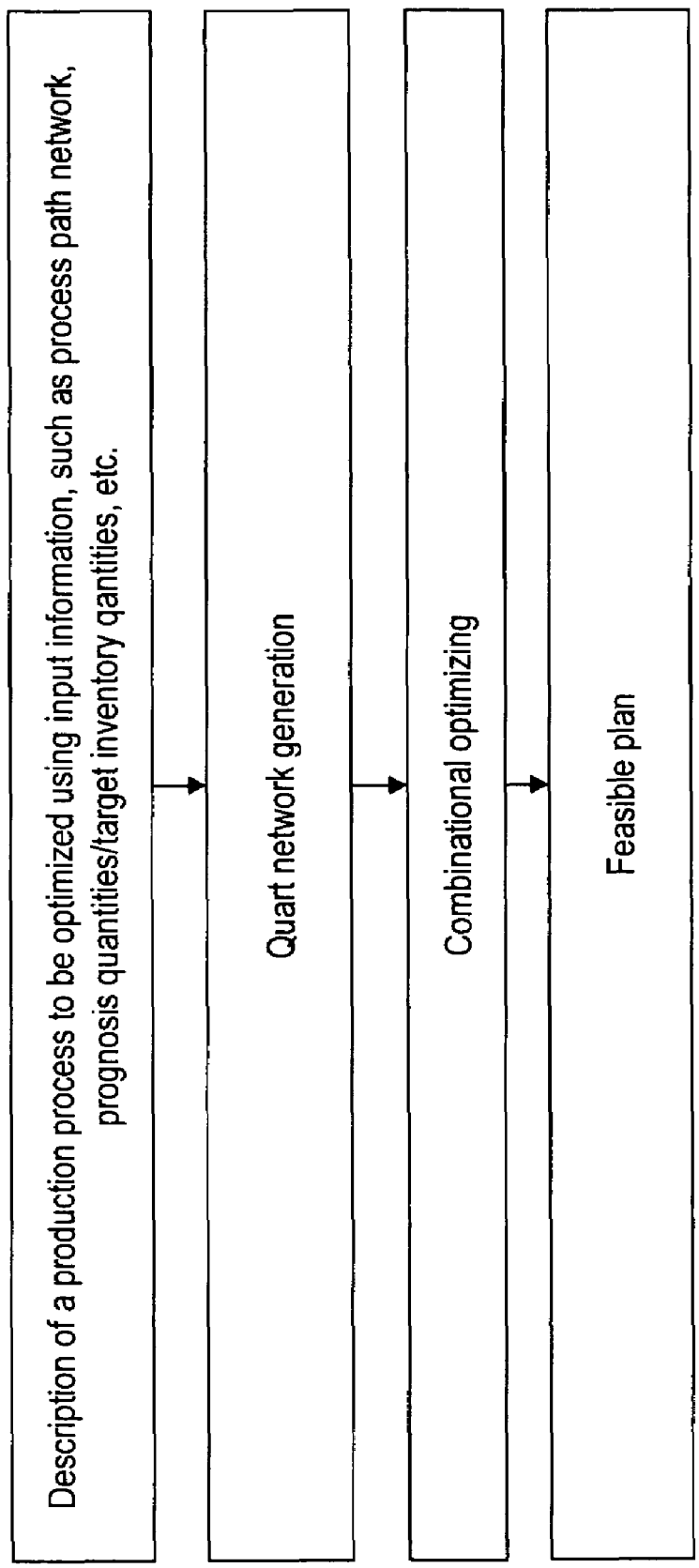
Fig. 2: Flowchart of the essential work steps for the optimization method according to the present invention using quant network generation

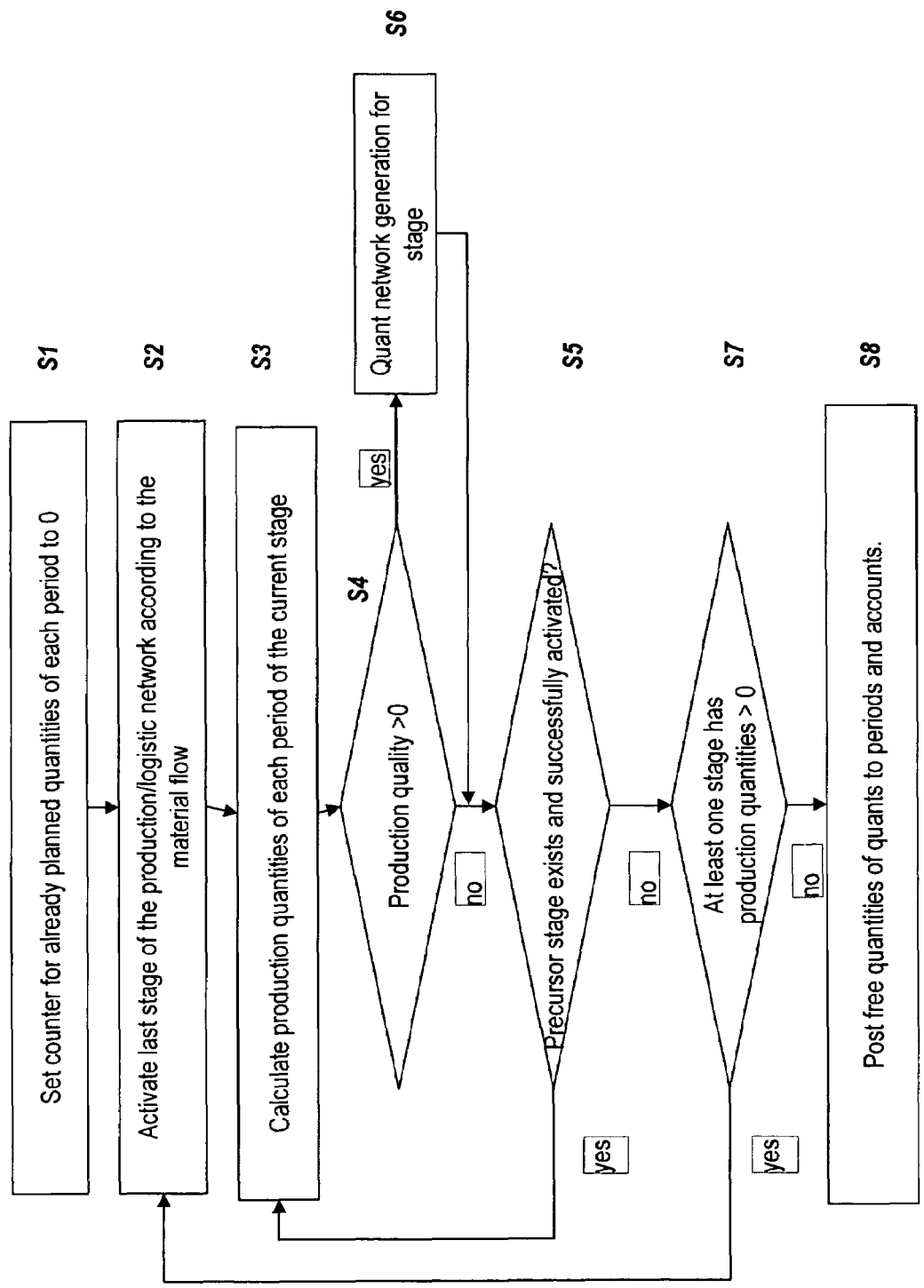
Fig. 3: Flowchart for the method step of quant network generation on department (stage) level.

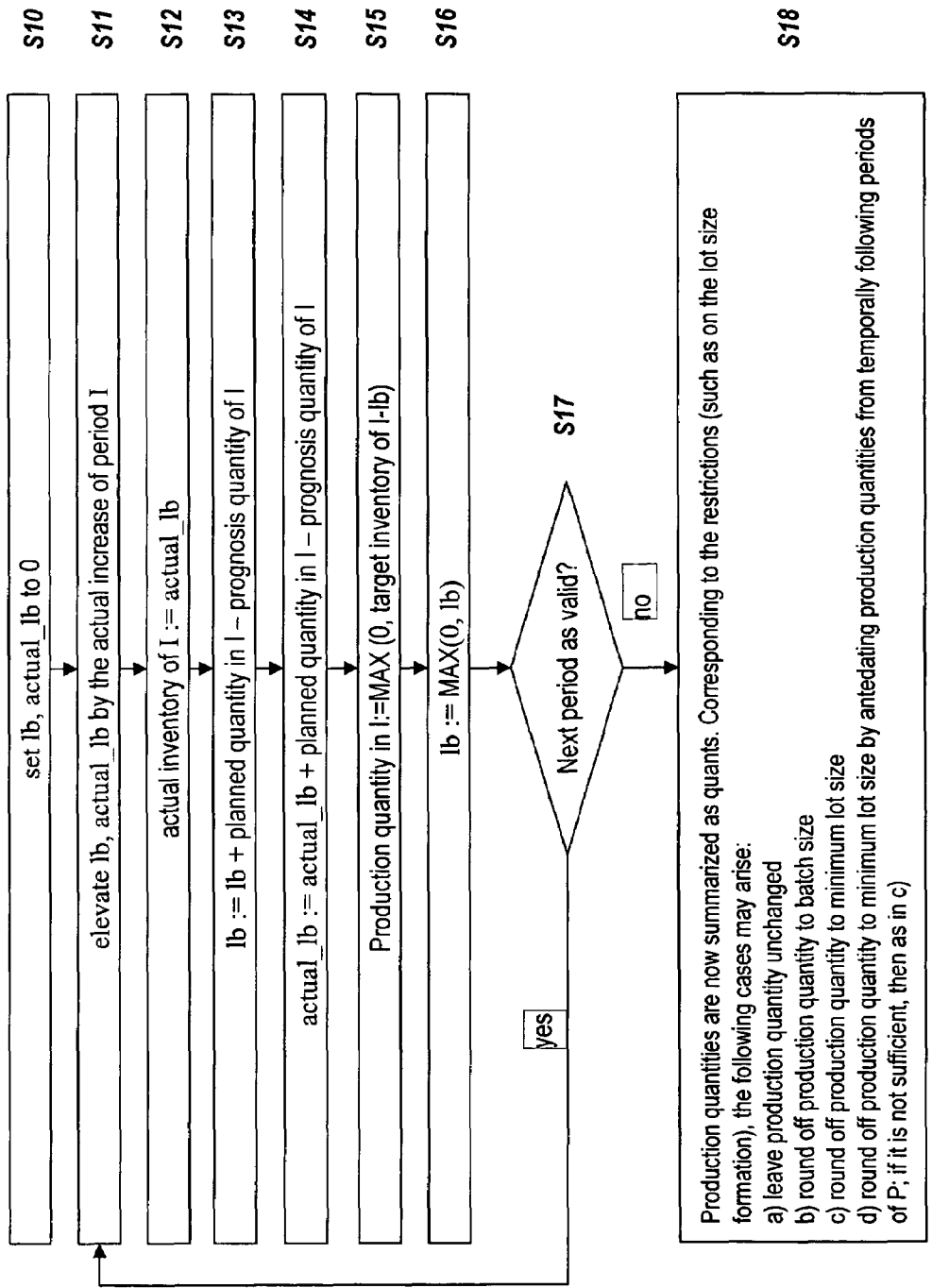
Fig. 4: Flowchart for the method step of production quantity calculation for a product P in all periods

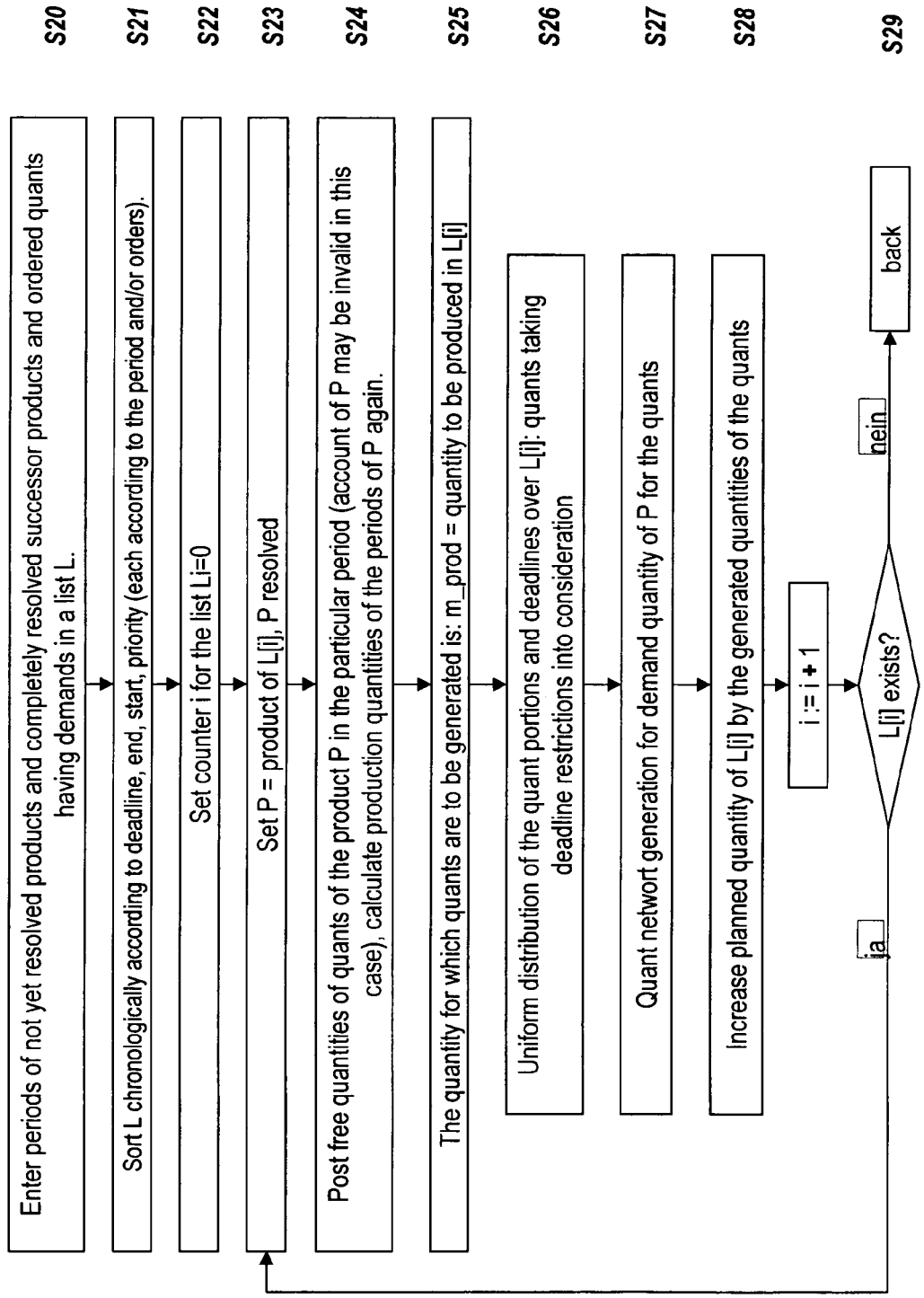
Fig. 5: Flowchart for the method step quant network generation for department (stage)

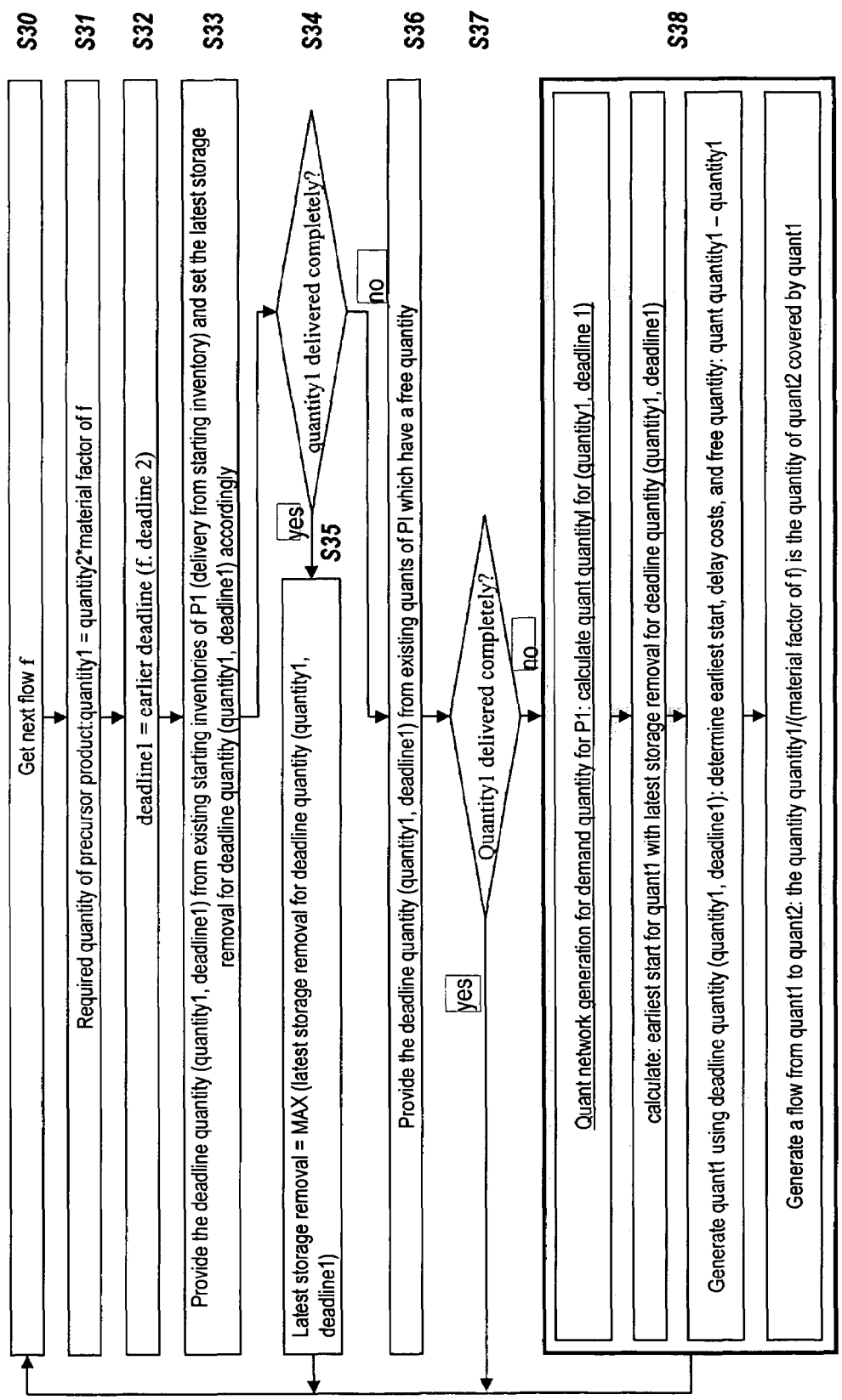
Fig. 6: Flowchart for the method step of quant network generation for the demand quantity of a product

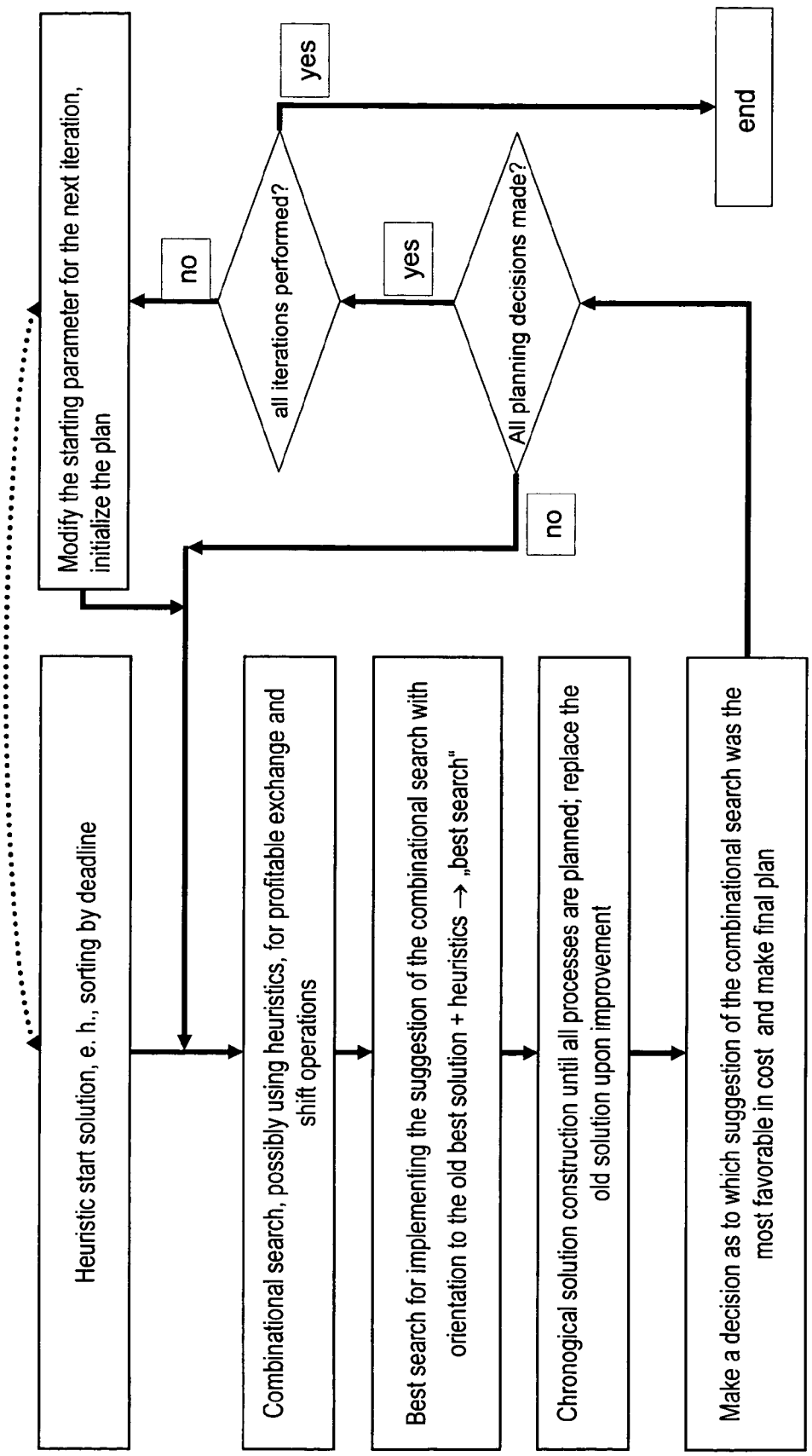
Fig. 7: Flowchart for performing an optimization

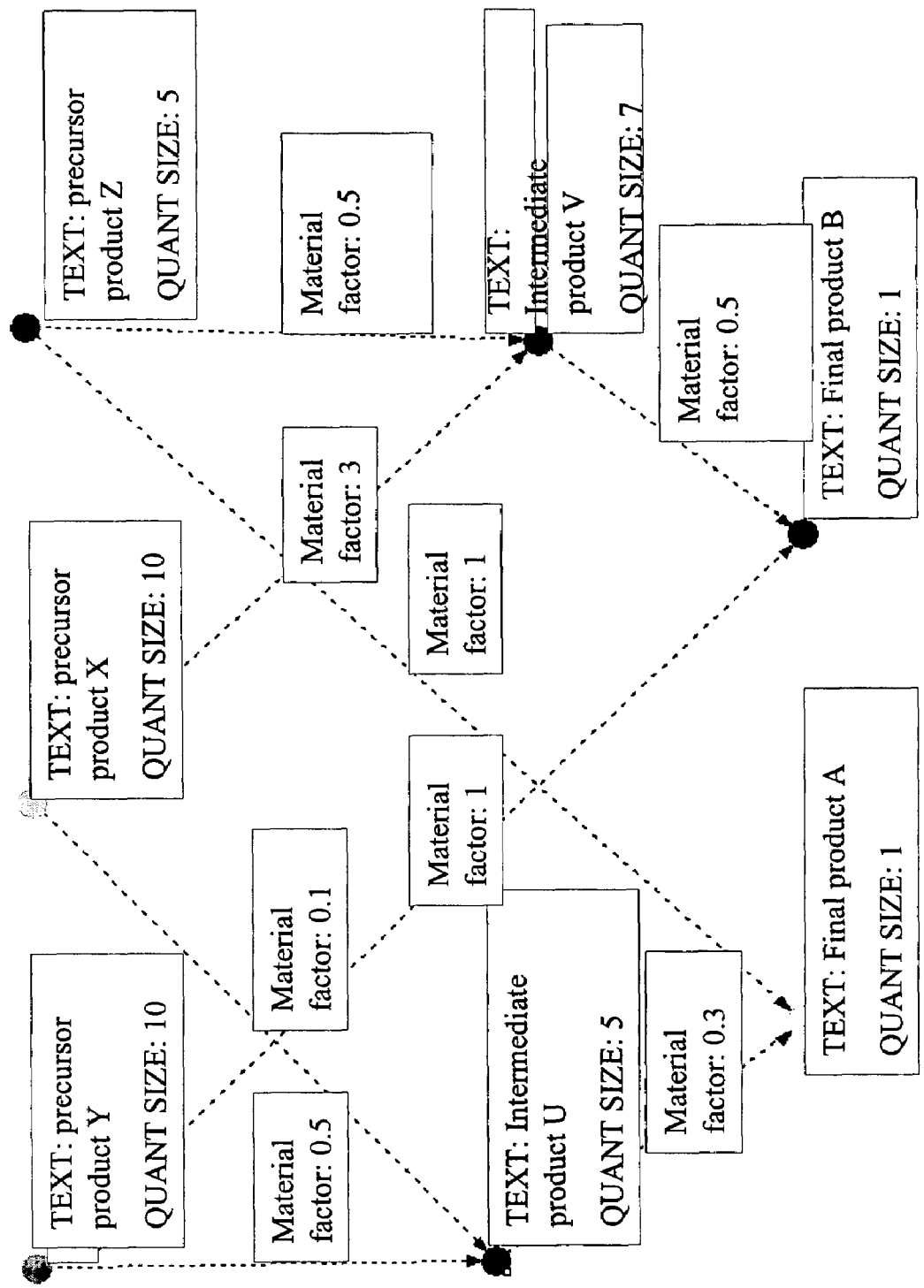
Fig. 8: Product and/or material flow network of the example

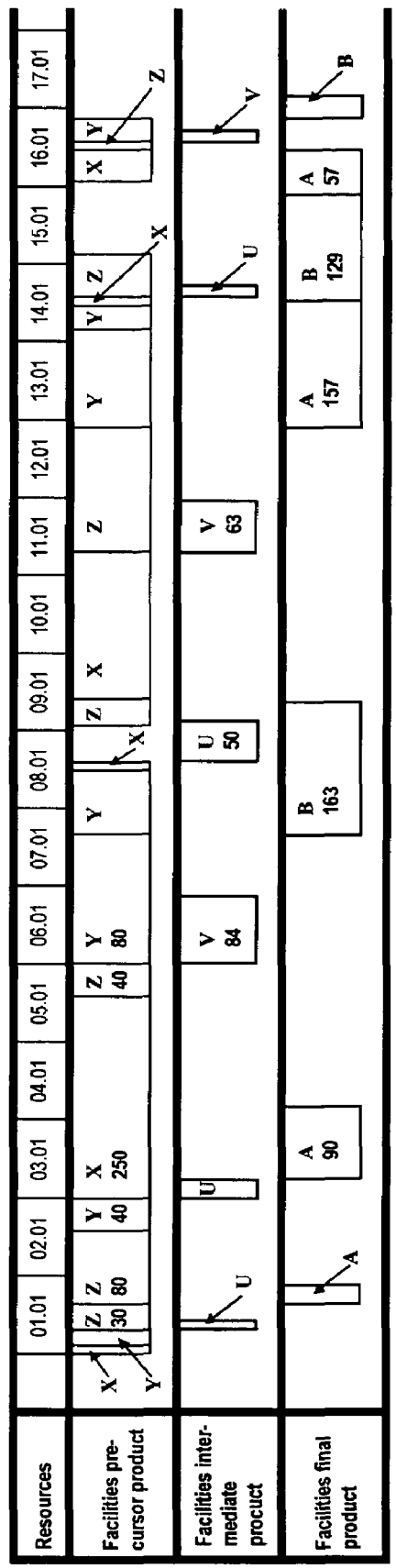
Fig. 9: Gantt chart to illustrate a product flow of the example

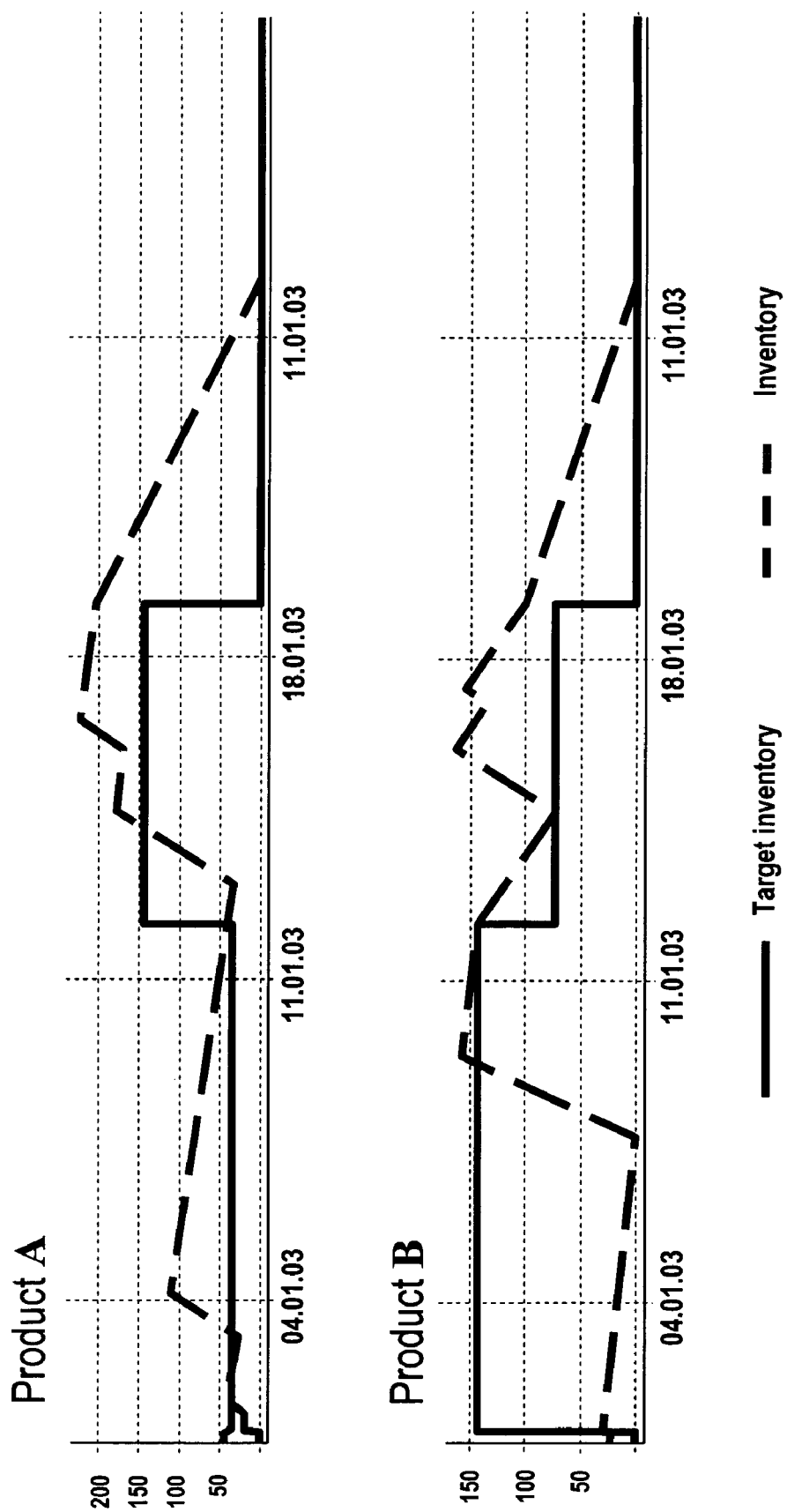
Fig. 10: Inventory and target inventory development of products A and B of the example

METHOD FOR THE OPTIMIZING OF A PRODUCTION PROCESS

CROSS-REFERENCE TO RELATED APPLICATIONS

This application claims priority under 35 U.S.C. Section 119(a) to German application number 102 52 294.4 filed on Nov. 11, 2002.

The present invention relates to a method for optimizing a production process having starting products, intermediate products, and at least one final product. As a result of the method, a feasible, optimized plan for performing the production process is obtained.

BACKGROUND OF THE INVENTION

Current production processes are generally complex and have a large number of production steps which are coupled to one another. As a result, there are one or more final products which were produced via a chain of intermediate products from starting products.

The planning of production processes is typically oriented to a demand for a final product at a specific time, the quantity of starting products to be processed and the time window for the individual production steps resulting therefrom. The demand for the final products is estimated from a prognosis function and the target inventory quantity for the periods observed is determined therefrom, taking a storage reserve into consideration. The prognosis function is typically determined empirically or using a prognosis method. The target inventory quantity, which may change over time, represents an essential starting parameter for the optimization of the production process.

The current methods for production planning essentially follow a formulation in which the capacity planning to be optimized is modeled as a linear planning problem (LP problem), the LP problem being solved using commercial products and being implemented in a production plan using a downstream scheduling strategy, which is often heuristic. Commercial products which are used to solve the LP problem are, for example, standard LP solvers, such as those offered by the companies ILOG or dash optimization.

If only one single product is planned, the capacity plan also automatically provides a production plan. This is frequently no longer relevant for multiple products, since the LP solution only provides capacity utilizations for certain time intervals. For the preparation of an optimum production plan for more than one product, a downstream, combinational problem is therefore to be solved. Since such combinational problems are only solvable with exponential computing outlay because of the mathematical complexity, the combinational solution is therefore excluded for problems relevant in practice from a very small number of products (approximately 5). Therefore, one attempts to avoid the significant computing outlay using task-, location-, and/or product-specific scheduling strategies which are based on heuristic methods.

A balanced quantity plan provides little or no information on whether and how a sequence plan which may be implemented is to appear. The sequence planning is completely decoupled from the capacity planning. Joint optimization of capacity and sequence plans is therefore not possible. Even productions having fixed plans and/or which have already begun may only be taken into consideration in the preparation of the production plan with great difficulty. Therefore, the production plan derived in this way no longer corresponds to the original capacity planning, and the quantity balance sheets which represent a minimum requirement for a production plan are no longer balanced, for example. For "batch productions" and/or "campaign formations", the material balance sheets must be checked again and again and possibly corrected. This increases the maintenance outlay of the planning significantly. These problems require increased caretaking, sometimes with very complex individual programming.

The modulation of the LP problem is performed in two parts using methods according to the related art. First, for the capacity planning, a supply-network planning model is used in which neither sequence restrictions, lot size restrictions, temporal restrictions, storability restrictions, pass-through times, or other things may be imaged correctly. The more detailed planning is left to a second model in a second step which performs the planning of the production sequences with the aid of heuristic rules, such as a scheduling strategy. These heuristic rules are frequently overtaxed with the capacity and/or storage optimization.

Because the modulation is performed in two steps, it may not be ensured that the goals of the capacity planning and the production sequences are taken into consideration jointly during the construction of the production plan. The practice of production planning shows that significant manual corrections are to be performed by the user. In this case, the unreliable results, whose quality is highly doubtful, represent a large disadvantage. In addition, this method is very susceptible to errors, since production-specific restrictions and finite capacities are to be taken into consideration manually and simultaneously by the planning person and facility capacities may frequently be assigned by multiple persons. A synchronization problem then arises between multiple planning persons if they modify the same resource.

For the reasons cited above, production planning with the aid of a model tailored for an LP solver leads to unacceptable and unfeasible production plans. It is especially disadvantageous that only linear dependencies may be imaged using an LP model (quantity balance sheets such as "the product A must first be produced before it is consumed" correspond to linear equations or capacity restrictions, such as a maximum production rate, correspond to inequalities). A realistic planning situation may be described only insufficiently using linear restrictions, however.

In order to be able to guarantee the preparation of a viable plan, other dependencies are necessary for modeling qualitatively, which may be described only poorly or not at all using linear equations or inequalities. These essential restrictions include non-linear conditions ("at a specific time, fractions of a product may not be produced on a facility, but rather none or precisely one. A plan quantity must always be a multiple of a batch quantity."), sequence-dependent conditions ("For the production steps 1, 2, and 3, the product A may never be produced before the product B."), or storability restrictions ("product A may not be stored temporarily for longer than two days.").

These and similar restrictions require the introduction of integrity conditions and/or binary variables and lead to an MILP model (MILP=mixed integer LP). This is an expansion of an LP model using integrity conditions.

MILP problems may not be solved using the standard techniques of an LP server and require completely different solution techniques. In order to be able to compute the optimum solution of an MILP problem, in general, all possible assignments of the integrity conditions must be analyzed and compared. Viewed from a mathematical standpoint, this is an NP-complete problem. In practice, this means that it may not be solved like an LP problem, for example, in polynomial computing time as a function of the parameters described, but rather that an exponential computing outlay is necessary for this purpose as a function of the number of integrity conditions.

If it is assumed that an MILP problem having ten integrity conditions for a product may be solved in a specific time, then this same task requires 32 times as much time with 15 products and 1024 times as much time with 20 products. An MILP problem may therefore only be solved in a justifiable time with very few integrity conditions. This restriction, which is purely a matter of computing technology, is the essential reason the non-linear, sequence-dependent restrictions or storability restrictions are either completely ignored or only an insufficiently small number of machines, products, and planning periods are permitted in the MILP model observed.

SUMMARY OF THE INVENTION

It is therefore the object of the present invention to provide a novel optimization and planning method in which, particularly for planning problems having integrity restrictions, optimization of the production process may be performed in an acceptable time.

This object is achieved by the method according to claim 1. Further advantageous embodiments of the present invention are specified in the dependent claims.

According to the present invention, a method for optimizing a production process having starting products, intermediate products, and at least one final product is provided. As a result of the method, a feasible plan for performing the production process is obtained. The feasible plan is determined from the starting variables of predetermined target inventory quantity, demand for and costs of the final products in predetermined periods, a product flow network in which a production step is described by a product and the linkages between production steps are described by precursor and successor products as well as by the material factors and transport times, and production-dependent lot sizes of starting and intermediate products as well as integrity restrictions. The method essentially includes the steps of quant generation and optimization, a quant network which has a quant for each production step being generated during the quant generation if a demand for a product arises (triggered by a target demand for the product or a quant of a successor product). A quant is determined by a product, a period, and a production step, which is essentially determined by a starting time and an end time. For each quant, demands for the precursor products given according to the product flow network and the target inventory quantity of the products corresponding to the quant are established by running through the quant network starting from the target inventory quantity of the product of the last quant according to the product flow network via the individual production steps up to the first quant, by establishing the particular demands for the precursor products. After each determination of a demand for the particular precursor product for the quant observed, the demand for the precursor product established is checked in order to tailor the demand established to the production-dependent lot sizes and/or to integrity restrictions. The step of optimization of the quant network thus established, taking the individual production steps of the quant network into consideration, results in a temporal sequence for the execution of the individual product steps and a unique assignment of quants to at least one resource.

The method is essentially divided into the steps of quant network generation and optimization. The first step, the quant network generation, transforms the product flow network into the quant network, which is the basis of the optimization in the second step. Therefore, it is ensured that during the optimization the calculations are done on plans having balanced quantity balance sheets, correct lot size production, and correct sequence conditions.

During the quant network generation, the product flow is transformed into the quant network, whose nodes represent the quants, the linkages between the quants defining the structure of the quant network. The quants represent the smallest possible production steps in the product flow network. As a whole, they quantify both the product flow of the overall production process and production steps without material flow.

During the quant network generation, the quants for each production step are generated first. A quant is determined by a product P, the period I, and a production step S, which is determined by a starting time and an end time and by the associated precursor products. A quant is generated if a demand for a product P exists in the period I. the demand is triggered by a target demand for the product or a quant of a successor product, i.e., a quant whose associated production step is assigned to a precursor product which is identical to the product P observed.

For each quant, demands for the precursor products given according to the product flow network and the target inventory quantity of the product corresponding to the quant are established by running through the quant network starting from the target inventory quantity of the products of the last quant according to the product flow network via the individual production steps up to the first quant by establishing the particular demands for the precursor products.

After each establishment of a demand for the particular precursor product for the quant observed, the demand for the precursor product established is checked in order to tailor the demand established to the production-dependent lot sizes and/or to integrity restrictions. This step of tailoring is essential for taking the critical boundary conditions into consideration in the method. The actual quantity to be produced results, the production quantity, which, limited by the restriction cited above, does not have to correspond to the demand quantity and triggers the generation of one or more quants. The quant network generation ensures that the network which the optimization is based on always has 1. a balanced quantity balance sheet,
2. correct lot size formation, and
3. correct sequential conditions according to the product flow.

The
1. temporal assignment of the execution of the individual production steps and
2. a unique assignment of quants to at least one resource is performed during the subsequent optimization of the quant network. As the following explanations show, temporal assignment is already established approximately during the quant network generation in order to provide a good starting solution.

The method according to the present invention represents a novel method for establishing a feasible plan for performing a production process. It offers the possibility of establishing a feasible production plan without complex, abstract mathematical model formation, using which the production of products may be performed more rapidly, more flexibly, and more cost-effectively, i.e., using fewer resources. A further advantage over the methods previously used is that it is more flexible and production-dependent lot sizes and/or integrity restrictions may be taken into consideration during the preparation of a quant network, even before the step of optimization and, unlike the method according to the related art, the optimization does not have to be performed first and the production-dependent lot sizes and/or the integrity restrictions do not have to be incorporated into the calculated optimized solution, possibly even manually, therefore frequently even changing the optimized solution for the worse. A further advantage is that cycles are taken into consideration in the product flow network, i.e., a successor product of a production step is again considered as a precursor product and/or pre-precursor product, etc., in the production of the successor product. The current standard methods are overtaxed with such cycles.

The optimization method essentially provides two steps. A first step, in which a quant network is generated from quants and a second step, which optimizes the production process on the basis of the quant network established. The quant network is produced by generating quants. Quants are generated if a target inventory quantity of final product is not equal to 0 and, in addition, if a demand for a successor product of a process exists and/or a specific quantity of a product is necessary, i.e., a process exists using which the product or the successor product must be produced. This process possibly uses precursor products. A quant is then generated which relates to the successor product. It is said that the successor product is produced by the quant and/or the quant is generated for the provision of the demand. The quant also includes a period and a production step having a starting time and an end time. The generation of quants is performed chronologically using the earliest period in time for each of the final products and intermediate products, starting from a period in time determined by a target demand for a final product in the period.

During the generation of each quant, the demand for the precursor product is checked, the production-dependent lot sizes and/or integrity restrictions being taken into consideration. This is typically performed by rounding or tailoring to the closest possible lot size and/or batch size. In this way, even during the subsequent generation of a further quant in the period preceding in time, for which the precursor product of the period just observed represents the successor product of the preceding period, the production-dependent lot size and/or the integrity restrictions are taken into consideration. In this way, a quant network is prepared which is the basis for a subsequent optimization step and in which the restrictions because of production-dependent lot sizes or because of integrity restrictions are incorporated.

Such a method thus results in a quant network in which the integrity restrictions and/or the restrictions in regard to the production-dependent lot sizes are taken into consideration and therefore do not have to be tailored afterward, so that the result of the optimization may not subsequently be worsened.

The checking of the particular quantity of the precursor product established as necessary in regard to production-dependent lot sizes and/or in regard to integrity restrictions is preferably performed by rounding to a predetermined value. The predetermined value may be determined through many types of restrictions. In exceptional cases, tailoring in regard to these restrictions may also be performed through rounding.

According to a further aspect of the present invention, a computer system for performing the method according to the present invention is provided.

A preferred embodiment of the present invention is described in greater detail in the following on the basis of the attached drawing.

BRIEF DESCRIPTION OF THE FIGURES

FIG. 1 shows a flow chart to illustrate the method according to the related art;

FIG. 1a shows a capacity planning diagram and an inventory graph resulting therefrom;

FIG. 1b shows a diagram to illustrate the sequence and campaign planning of the quantity plan and the resulting inventory graph;

FIG. 2 shows a flow chart for a method according to a preferred embodiment of the present invention;

FIG. 3 shows a flow chart relating to the method step of quant generation;

FIG. 4 shows a flow chart relating to the method sub-step of calculating the production quantities for each period of a product;

FIG. 5 shows a flow chart of the method sub-step of quant generation for a stage;

FIG. 6 shows a flow chart of the method sub-step of quant generation for an inventory quantity for product P;

FIG. 7 shows a flow chart for performing an optimization method;

FIG. 8 shows an exemplary material flow network;

FIG. 9 shows a Gantt chart to illustrate a production flow; and

FIG. 10 shows inventory graphs for products A and B.

DETAILED DESCRIPTION OF THE INVENTION

FIG. 1 shows a flow chart which, starting from previous information provided which describes a production process, generates a feasible plan for performing the production process. The previous information provided contains, among other things, statements about the process path network, the flows, the products, and statements about the prognosis intervals for each product. In a next step, a model of a linear planning problem and/or a mixed integer LP is established. The linear planning problem thus established is subsequently solved with the aid of known optimization products. If only one single product is planned, the capacity planning also automatically provides a production plan. This is no longer the case for multiple products, since the LP solution only provides capacity utilizations for time intervals, without taking the setup times and the actual sequence of the process of the different products into consideration. During the preparation of an optimum production plan for more than one product, a downstream, combinational problem would therefore need to be solved. Since such combinational problems are solvable only with exponential computing outlay due to the mathematical complexity, the combinational solution is therefore excluded for practice-relevant problems from a very small number of products. Instead of the combinationally optimized solution, a manual optimization is frequently performed and the solution previously calculated by the LP solver is thus disadvantageously changed.

The classical solution formulation of production planning is to be illustrated using an example. In FIG. 1a, the result of capacity planning using an LP formulation and an inventory graph resulting therefrom are illustrated. The production is divided into three time units (time buckets) in such a way that the demands for the products A, B, C, which arise through productions on other machines and anonymous demands, do not lead to any deficient cover: the balance sheets are correct in each time unit. In order to reduce costs, it is expedient to minimize the setup and cleaning outlay, which results through the change during the production from one product to another product B. As shown in FIG. 1b, the sequence and campaign planning of the quantity plan are then obtained, the products having to be produced in sequence, only two modifications and/or cleanings of the machine having to be performed. However, this has the consequence that deficient covers, i.e., negative inventories, result through the demands for the products A, B, C to be debited. Therefore, this sequence plan is not permissible.

The modeling using a typical method for production planning is decomposed into two parts: a planning model for the capacity planning, which may not correctly image sequence restrictions, lot size restrictions, temporal restrictions, storability constrictions, or pass-through times. Only in the second step is the detailed planning left to a second model, which is generally to provide the planning of the production sequences on the basis of heuristic rules, such as a scheduling strategy. These heuristic rules are overtaxed by simultaneous capacity and/or storage optimization.

Due to the decoupling of the two models, it may therefore not be ensured that both targets, specifically the capacity planning and the production sequence, are taken into consideration jointly during the construction of the production plan. Typically, significant manual corrections are performed by the planner in practice.

The result of the optimization is a plan for the overall production process which assigns the resources available to particular partial production steps, the quants. The plan has two criteria to fulfill: feasibility and optimality. The feasible plan determines
  1. the assignment of the quants to the individual resources and
  2. the time interval in which the particular quants are to be produced from the resource.

The feasible plan is designed in this case in such a way that no impossible assignment exists, e.g., no over-assignment of a resource occurs.

The optimum plan takes the optimality of the resource exploitation in regard to a quality criterion, e.g., minimum costs, total time outlay, etc., into consideration.

The method according to the present invention is based on the generation of the quants from a demand prognosticated for each product and the linkage of the quants into a quant network, which corresponds to the product flows of the original product flow network and the accounts of the products contained therein. In particular, the novelty of the method is based on the step introduced of generating the quant network and its linkages in accordance with the procedure described in one of the sections herein.

The production process is described by the product flow network. The nodes of the network represent the starting, intermediate, and final products, referred to as a whole as products. The directed linkages between the products represent the product flow and thus describe necessary precursor and successor relationships of the products because of the production-dependent intermediate steps. Each product may have any arbitrary number of precursor products and any arbitrary number of successor products. The relation of precursor product and successor product is determined by the material factor (approximately %), which determines the ratio of the quantity proportion of the precursor product during the production of its successor product. The product flow network may contain cycles. Production-dependent subdivisions of the production flow into departments (also called stages) are taken into consideration, i.e., a production may be subdivided into multiple stages, such as the provision of the raw materials, the processing of the raw materials into a final product, and the sale of the final product to customers. Naturally, the reduced product flow network is free of cycles in regard to the departments.

The following restrictions are to be maintained:
1. availability of the resources,
2. planning window for assignments of partial process steps to resources (earliest start, latest start, deadline),
3. variable restrictions for lot sizes (such as batch sizes, palette sizes, etc.)
4. deadlines for orders
5. desired inventory graphs
6. usage of residual inventories and excesses
7. varying costs and availability of starting products and alternative resources.

Typically, up to 20,000 processes are simultaneously observed, in practice, complexity allows problems of the size of up to 100,000 processes.

In FIG. 2, a sequence of the method according to the present invention is shown in overview. Starting from the initial variables provided, generation of a quant network is first performed. While the process used is in the foreground for the process path network, i.e., nodes each represent a production step and the connections between them represent material flows between the particular production steps, the quant network includes quants, which may be graphically illustrated as nodes and which each represent the production of a product in a specific period.

A quant of a product P is generated when the difference between the target inventory quantity and the calculated inventory of this product in a period is greater than 0. A quant is also generated when a demand for the product P arises from a quant of a successor product. In both cases, the quantity of the corresponding product P to be produced is greater than 0. In addition, the quantity to be produced must be producible by one production step of the product P. The production step possibly uses precursor products from which a quant of the successor product is "produced". The quant also includes a period and a production step having a starting time and an end time.

The material flow is described by the connections between the quants. I.e., during the quant generation, starting from a process path network and previously existing product information and prognosis intervals, a model is generated which images the production process and the material flow on the basis of starting products, intermediate products, and final products. The relationship between the starting, intermediate, and final products is described by variables which specify the material use. In this case, a material factor is used which indicates the proportion of a precursor product in relation to the obtained successor product of a production step.

For the quants of the quant network, minimum lot sizes and/or production-dependent lot sizes and integrity restrictions may be taken into consideration, so that using the quant network a model arises which may be optimized with the aid of a subsequent combinational optimization method without later manual or other types of changes having to be performed on the final solution, the feasible plan for performing the production process.

In the following, a preferred embodiment of the method according to the present invention for quant generation is described.

The most important previous information which describes the production process, i.e., input variables which are necessary for generating a quant network, are the prognosis quantities for the periods I observed and for each product P to be produced. Target inventories for each product P and each period I may be determined according to target inventory $(P, I)$=range $(P)$/prognosis interval length $(I)$*sales quantity $(P, I)$+reserve inventory $(P)$;

the range corresponding to the time in which the stored inventory would be sufficient for continuous estimated maximum reduction (sales quantity), the prognosis interval length corresponding to the time unit upon which the calculation is based, and the reserve inventory corresponding to a minimum stored reserve.

The period is a period of time and is defined by a product and the time in which the prognosis quantity and/or the target inventory is to arise. The period is established empirically like the prognosis quantity or using prognosis methods.

Furthermore, product information which describes the product is necessary as previous information, such as the maximum storability, cost information (storage costs, delay costs, production costs, raw material costs, product value, etc.) and information about production processes which contain the individual production steps, it being specified which precursor products are processed in a process and which successor products are produced. Material factors specify what ratio precursor and successor products have to one another.

This information is typically represented in the process path network, in which statements about process information in the form of time conditions, such as production time, transport time, and buffer time are also indicated.

The goal of quant network generation is a quantity balance sheet balanced between production demand and production availability both globally and locally, taking the restrictions in regard to lot size production, integrity, etc., into consideration.

For each product P and each period I there is a basic demand which is quantified by the prognosis quantity and the target inventory. The prognosis quantity of the period I is an estimated demand which may be established through a prognosis method. Prognosis quantities may also be assumed for intermediate products of the production process, but the prognosis quantity of an intermediate product is frequently zero. The prognosis quantities for the final products result from planned sales numbers and experiential values of sales and correspond to the sales quantity expected.

The basic demand is faced by a certain inventory plus the planned quantity. The planned quantity is the sum of the partial quantities which are produced in the process steps already planned through production of the product P for the period I from permissible precursor products. These already planned process steps are represented according to the method by a quantity of quants. Each of these already generated (i.e., planned) quants generates exactly one unique partial quantity of the observed product P, which is referred to as a free quantity.

From the balance between basic demand in the form of prognosis quantity and/or target inventory on one side and the sum of inventory and already planned quantity on the other side, a still existing demand results, which, taking restrictions such as lot size formation, integrity, etc., into consideration, leads to the production quantity, which in turn must be converted in the course of the method through further quant generations into free quantities and may therefore be added to the planned quantity. Therefore, the following equations result:

planned quantity $(P, I)$=$\Sigma$ free quantities $(P, I)$, demand $(P, I)$=MAX (0, basic demand $(P, I)$− (planned quantity $(P, I)$+inventory $(P, I)$)), production quantity $(P, I)$=restrictions (demand $(P, I)$)

The quant and quant network generation is finished when all of the production quantities for all products disappear for all periods. A product is referred to as solved (in the sense of the method sequence) when the calculated production quantities of all periods disappear (i.e., are equal to 0).

In FIG. 3, the general sequence for the method for generating a quant network is illustrated. Jumps to sub-functions are shown bold and underlined in the flowcharts.

In a step S1, the counters for the already planned quantities of each period are set to 0.

This level of the method also includes two interleaved loops, the first loop, formed by steps S2 through S7, relating to the particular production department and therefore the associated stage of the product flow network. Starting from a prognosis quantity which is a function of, for example, in which time which demand exists at the customers, the quant network is first generated for the last stage of the product flow network (i.e., the associated department); then in the reverse product flow direction for all preceding stages (i.e., production departments).

As soon as production quantities are still to be resolved according to the query of step S7, at least one more quant must be generated, so that a further iteration beginning with the last stage of the production network is performed.

The generation of the quant network is performed in the second loop, which includes the steps S3 through S6. The sub-function "calculate production quantities of each period of the current stage", (step S3) and, if there are still production quantities to be resolved, the sub-function "quant generation for stage" (step S6) are called repeatedly therein.

At the end of the quant generation process, all necessary quantities and/or target inventories are resolved, i.e., all demands are covered both globally and locally by the quants generated. The free quantities of the quants are posted, i.e., fixed to periods and quantity nodes, in step S8.

The sub-functions are described in the following. Starting from the last period of the step just observed, the production quantity, i.e., the quantity of the "successor product" observed to be produced, is calculated in the sub-function "calculate production quantities of each period of the current stage". This is shown in the flowchart in FIG. 4.

The following variables are used in this sub-method:

lb: stored inventory with the assumption that the production quantity to be calculated is implemented, therefore lb is an estimation of the sum of the free quantities which are assigned to the quants generated in the future and which always positively balances the quantity balance sheet;

actual_lb: balanced stored inventory (which may also assume values less than 0); and I: the period observed.

The calculation of the production quantities according to the method shown in FIG. 4 simultaneously also calculates the account, i.e., the actual inventory, for the observed product of each period.

In a step S10, the stored inventory lb and the balanced stored inventory actual_lb are set to 0.

Subsequently, a loop begins in which each period I of the stage observed is taken into consideration. First, beginning with the initially observed chronologically first period I, in a step S11 the stored inventory lb and the balanced stored inventory actual_lb are increased by the quantity of the actual supplies (starting variable) in the period I observed.

In a step S12, the current account is updated for the product corresponding to the actual inventory in the form of the balanced stored inventory actual_lb.

In steps S13 and S14, both lb and actual_lb are increased by the planned quantity in the particular period I and reduced by the prognosis quantity of the period I.

In a step S15, the production quantity of the period I observed is calculated from the difference between target inventory of the period I observed and the stored inventory lb. Since this value may be negative, but the production quantity may not be negative, the production quantity is set to 0 if the difference between the target inventory and the imaginary stored inventory results in a negative value.

In a step S16, the stored inventory is set to 0 if a negative value has resulted for the stored inventory lb from the calculation of step S13, since a negative value may not exist for the stored inventory. If this is the case, it is assumed that quants generated in the future will again balance the inventory. The difference between actual_lb and lb results through the maximum formation in S16. The value lb is therefore an estimation of quants generated in the future, which balance the inventory to greater than or equal to 0 in any case.

In the following, in accordance with the query of step S17, the next period I+1 is observed. The imaginary stored inventory lb and the balanced stored inventory actual_lb and the quantity of the actual supply of the observed period I+1 are again increased as in step S11. Like step S11, the steps S12 through S16 are now repeated until all periods have been processed.

In a step S18, the production quantities thus established are checked in regard to production-dependent lot sizes and integrity restrictions. As a result, production quantities are obtained for each product and for each period, quants being generated, in the cases in which the production quantities are not equal to 0, which balance the production quantity calculated for each product and production step.

The production quantities are essentially tailored in regard to the production steps assigned thereto. They are rounded to a minimum lot size and/or, for batch processes, to a multiple of the batch size. These minimum lot sizes and/or batch sizes result for starting products, for example, in that specific product types may only be provided in specific quantities or, for other products, in that they may only be processed further in a finishing facility in a specific quantity. If other quantities are necessary, the closest possible larger product quantity must be processed.

Integrity restrictions are also thus observed. If it follows from a demand that a precursor product is to exist in a fractional quantity, an implementable piece count for the quantity necessary is again calculated by rounding to the next whole number.

For intermediate products, the minimum lot size and/or the batch size are determined in that a production process only operates efficiently at a minimum number of intermediate products to be produced and/or a production process always processes a specific number of intermediate products simultaneously. If a production quantity which may not be implemented results, in step S18 this production quantity is correspondingly tailored to the properties of the production process.

In addition, the production quantities are rounded as a function of the production (i.e., as a function of the parameters) to the minimum lot size and/or batch size in that production quantities and/or parts thereof are antedated from subsequent periods. This corresponds to an antedated production of a specific intermediate product, which then remains initially as a free quantity in the particular production step and is taken into consideration upon subsequent calls of the sub-function "calculate production quantities for product".

In the following, as may be seen from the flowchart in FIG. 3, for each stage which has a period in which one of the production quantities has resulted in a value greater than 0, in step S6 the sub-method "quant network generation for stage" is called. This is shown in FIG. 5.

First, in a step S20, the periods of unresolved products whose successor products have already been completely resolved are entered in a list L.

In a step S21, the list L is chronologically sorted according to deadline, end, start, and priority. The list L is provided with an index variable i for this purpose.

In an iteration beginning with step S22, the list is processed. For this purpose, the index variable i is counted upward beginning with 0.

In step S23, the current position according to index i of the list L, i.e., a product P in a period I, is selected for subsequent processing.

In a step S24, the free quantities of quants of the product P are posted in the particular associated period, i.e., the free quantities of each already generated quant are added to the inventory. The sub-method "calculate production quantities for a product" shown in the flowchart in FIG. 4 is performed again in order to establish possibly newly arising production quantities.

In a step S25, it is determined for which quantity now to be produced additional further quants are to be generated. This is the production quantity calculated in the preceding step. It fulfills the restrictions of production-dependent lot sizes, predetermined batch sizes, and integrity restrictions.

In step S26, a distribution of the quants to be produced over the prognosis interval is calculated. The step S26 optimizes the stored inventories in regard to minimizing the inventory at the beginning of the period observed. For this purpose, the deadlines of the quants to be generated are first distributed uniformly over the prognosis interval and subsequently shifted according to the following rules:

(1) Shift of the deadline into the future if a starting inventory is present, i.e., the inventory is "overfulfilled" by free quantities of the quants, in order to avoid high inventories.

(2) Shift into the past in the event of a slow production speed of the quants, in order to avoid negative inventories.

The termination in this phase is to be considered as generation of the structures and as calculation of starting solutions for the deadlines. It is explained in detail in one of the sections herein.

In a step S27, the function "quant network generation for demand quantity for the product P" is called. This function is shown in the flowchart in FIG. 6 and as described in the following. In this function, the flows of the quants of P generated in the preceding steps are calculated, which are now incorporated into the network.

In a step S28, the planned quantity is updated with the free quantities generated in step S27.

The steps S23 through S28 are now performed for all further list positions of the list L. For this purpose, the index variable i is counted upward (step S29). The iteration ends if a list position i has been reached for which there is no entry.

In the following, it is described how the deadline calculation for generated quants is performed, which were generated on the basis of a quantity to be produced in a period.

Firstly, the excess from the preceding period, which results from the difference between the target inventory and the actual inventory, and the exact demand, which is to be produced in the period, are established. The exact demand corresponds to the sales plus the target inventory and minus the starting inventory.

Secondly, the number of the quants in the period is established and/or determined through suitable production-dependent parameters. The production time available is the length of the period.

The goal of the deadline calculation is to distribute the deadlines of the quants uniformly over the time of the period I between the starting time of the period I and the ending time of the period I. If an excess is obtained in the preceding period, a shift occurs. The quants are distributed over the period I in such a way that a uniform decrease is covered by a uniform increase. A negative existing actual inventory (see "calculate production quantities for product") does not lead to a shift of the deadline in the direction of an earlier time. A possible negative actual inventory must be compensated for in the preceding period through production.

The production duration for the quantity of a quant is identified with tq.

(1) If an excess occurs, the timespan in which the excess will be consumed is established.
(2) If the production of the quantity produced by the quants may no longer be completely produced by the end of the period (e.g., due to slower production), shift is to be calculated in such a way that the production of the quantity still to be produced may be performed to the maximum extent on the fastest facility.

The production start of the first quant is then determined by:

production start=starting time of the period+shift (excess)−shift (slow production)

The quants are generated in a loop. The production starts result through the time of the production start of the first quant and through adding up the production durations tq of the quants. The deadline of a quant results through a calculation of the estimated production end from the production start of the quant plus the production duration tq of this quant. The deadline calculated in this way represents a start estimation for the optimization.

In the flowchart shown in FIG. 6, the function "quant generation for the demand quantity for the product P" is shown. In this case, the quants, which are determined by a successor product P2, the free quantity of the successor product (quantity2), and a deadline (deadline2), are networked with their precursor quants, which are in turn determined by a precursor product P1, its free quantity (quantity1), and its deadline (deadline1). This is performed by introducing linkages f, i.e., connections between precursor and successor quants, each of which is processed in the iteration described in the following. The linkages are generated from the flows of the product network used as a basis. The pairing of deadline and quantity of a quant is represented by a deadline quantity of the form (deadline, quantity).

Starting from the successor product P2, it is first determined in a step S31 what quantity of the particular precursor product quantity1 is necessary for producing the quantity of the successor product quantity2, which is determined by the quant observed. This is possible with the aid of the quantity of the successor product quantity2 and the corresponding material factor of the flow f observed by taking the quota into consideration.

The deadline for the precursor quantity deadline 1 is calculated in step S32 through
the transport time of the product between the processes observed,
the minimum production time of the successor product,
an extension factor by which the minimum production time is increased, and
a buffer time which indicates a safety framework.

A deadline quantity results from this which specifies a quantity of the precursor product and a deadline by which the precursor product must be provided at the latest. In this case, to calculate the deadline for the precursor quant, in general a differentiation must be made between
end-start relationships between successor and precursor quant, i.e., the material is manufactured completely and then transported to the next facility (sequential manufacture), and
start-start relationships, in which the production overlaps (batch manufacture).

For end-start relationships, the following applies: deadline1=MAX (0, deadline2−minimum production time successor)−transport time of f−MAX (buffer of f, minimum production time precursor*extension factor)

For start-start relationships, the following applies: deadline1=deadline2−transport time of f−advance time−MAX (buffer of f, minimum production time precursor*extension factor)

The advance time is the difference between the execution duration of the successor quant and the execution duration of the precursor quant.

In a step S33, the deadline quantity (quantity1, deadline1) is now provided from the existing starting inventories of the precursor product P1. The value of the variable deadline1 is set as the removal deadline for the latest storage removal of the precursor product P1.

If, according to a query in step S34, the quantity of the successor product P2 has been delivered completely, in step S35 the deadline for the latest storage removal is determined from the deadline quantity for the precursor product P1. This is a maximum formation between the reference provided for the latest storage removal and the storage removals just performed.

If the quantity of the successor product P2 could not be delivered completely (step S34), in a step S36 the deadline quantity (quantity1, deadline1) is provided from further existing quants of the product P1 which have a free quantity.

Subsequently, it is first checked in a step S37 whether quantity2 of the successor product may be provided completely from free quantities of existing quants of the precursor product P1. If the quantity of successor product P2 would be provided completely, the sequence goes to the next flow, i.e., precursor product of P2.

If taking the free quantities into consideration does not yet lead to the quantity of the successor product quantity2 having been completely provided, there is a demand, for which a new additional quant must be generated. For this purpose, in step S38 the sub-method "quant generation for demand quantity for product" is called again in order to generate a quant in regard to the demand for the precursor product P1.

This sub-method is therefore a recursive function which calls itself if sufficient precursor products have not been made available for production of the successor product. Therefore, in the event of still existing demands which have not been covered, new quants for the precursor product are generated and linkages from the newly generated precursor quants to the successor quants are generated.

Through the quant network generation, a quant network (process path network), which essentially contains quants and linkages between the quants, is generated from the previous information as a result.

In addition, linkages from actual inventories to quants are generated if a quant takes a quantity of a precursor product from an existing actual inventory. Vice versa, linkages of quants to demands are generated if a quant provides a demand with its quantity and therefore is to cause maintaining the inventory graph in accordance with the target demand. In this case, the quant-posts its free quantity to the corresponding product account and the demand debits a quantity from the product account (see sub-method "calculate production quantities for product P").

In this way, a quant network is established. The nodes represent the quants, while the arrows between the nodes represent the flows and linkages. The flows indicate which quantity of the particular precursor product, i.e., the precursor quant, flows into the production of the successor product, i.e., the successor quant observed. The sums of each product of the arrows pointing toward a quant indicate which precursor products flow in to the successor product in what quantity.

The complexity of the quant generation is restricted to polynomials. This results from the following consideration: if $M_{GES}$ is the total quantity of the intermediate and final products to be produced and $\epsilon$ is the minimum quantity produced by a quant, the number of quants to be generated is restricted by $M_{GES}/\epsilon$, assuming the material factors are restricted by $0<\delta<f<\infty$.

If the quant network has been generated completely, subsequently, in the optimization method, the production process is optimized and a feasible plan is developed which specifies how, when, and in which production process the product is to be processed. In FIG. 7, an example shows which steps such an optimization method may have. In the example shown, first a start solution is selected, heuristically, for example, by sorting according to deadline. Subsequently, a combinational search for worthwhile exchange and shift operations is performed. The suggestion of the combinational search is checked in relation to the preceding best solution and accepted as the new best solution if the new solution is better than the previous solution. Subsequently, the best established suggestion is selected according to a cost function. This optimization method is performed using parameters which may change until all planning decisions have been made.

The feasible plan essentially determines
(1) the assignment of the quants to the individual resources and
(2) at what time the particular quants are produced on the resource.

The feasible plan is designed in this case in such a way that no impossible assignment exists, e.g., that there is no over-assignment of a resource. The optimization method therefore has two tasks:
(1) Firstly, to establish a feasible plan from the quant network predetermined by the quant generation, and
(2) secondly, to optimize the feasible plan in regard to the quality criteria (minimum costs, total time outlay).

The optimization method, which is to establish an optimized feasible plan from the quant network established, is typically a known method which corresponds to the related art. Since the restrictions of
balanced quantity balance sheet,
correct lot size formation, and
correct sequence conditions are always fulfilled by reference to the quant network, these must no longer be taken into consideration during or after the performance of the optimization method.

In principle, different optimization methods are applicable. The branch-and-bound method represents a preferred optimization method. It essentially includes the following steps:
(1) Branch: enumeration of the possible solutions in a suitable way,
(2) Bound: establishing the lower limits for the optimum costs on the basis of these solutions.

The search tree method (branch and bound) is a very complex algorithm and solves complex problems using multiple restrictions according to predetermined rules. In each case, decisions are made and the most favorable alternative is always followed.

In the branch-and-bound method, there is also the possibility for backtracking. In this case, the optimization method immediately recognizes a worsened solution, in contrast to other algorithms, and returns to the origin, while in contrast simpler methods compute different variants completely and compare them subsequently.

The requirements for the optimization method are predetermined by the quant network and the production process, as well as by other restrictions. Therefore, only one process at a time may be planned on a facility, the processes must be allocated to a resource, and the processes have a planning window (early as start, laid a start, deadline).

Furthermore, the optimization method must be able to evaluate restrictions resulting from process-specific properties such as operating sequences, product sequences, work time models, personnel restrictions, storage limits, transport cost, etc.

The branch-and-bound method preferably optimizes a feasible plan in regard to a cost function and/or a time function. In this case, a search tree is first generated which includes all permissible solutions. The search tree contains nodes which represent individual partial solutions for individual production steps. During optimization, the nodes of the search tree are systematically checked. If it is established at a node that the possible partial solution causes higher costs, the node is cut off with all its successors and a solution which is better in regard to cost is sought. This solution, if it exists, replaces the previous best solution.

The optimization method leads to solutions which have been successively improved. The solution construction as a part of the planning process is to be designed in this case in such a way that acceptable solutions arise "automatically" and modifications may be performed on them by the user, such as shifting of processes/sequences, replacement of processes, facility changes, etc. A start solution must be made available.

The results of the optimization method are iteratively processed through an outer loop and the existing best solution is thus improved further by tailoring process and method parameters.

Such parameters are, for example:
"a solution having 10 processes less may not cost more"
"gaps may be at most twice as large"
"planning according to deadline"
"planning according to the start in accordance with the start solution"
"sorting according to product in order to save change costs"
"evaluation of intermediate solutions through comparison with best solutions"

The advantage of the branch-and-bound method is that it may be tailored relatively simply to changed tasks. In contrast, it is not possible in an LP model to optimize sequence-dependent costs (linearity of the target function). Using an LP model, processes may hardly be planned for facilities, since a quantity is to be optimized, but the process represents integrity restrictions if production-dependent manufacturing variables, batches, and manufacturing lots are to be maintained.

Because of the transparency of the method, it may be terminated at a specific time, even if the optimum solution has not yet been established. Thus, solutions or trends may be followed or controlled in a targeted way through manual change of parameters: the method therefore allows an interactive usage process.

The optimized feasible plan established is made available to a process control system for controlling a production process. There, the feasible plan is implemented in an assignment plan which allocates products, production quantities, and start and end times to the individual resources. Such process control systems are known from the related art and are offered by firms such as ABB (Produce-IT, Sym-Batch, DigiBatch), Emerson (Delta V), Honeywell (Total-PlantBatch, BMS, Batch Supervisor), Rockwell/Sequencia (RS-Bizware-Batch, EnterpriseBatch, OpenBatch), Siemens (BatchFlexible, BatchX, PM Batch), Wonderware (InBatch), Yokogawa (CS Batch 3000), for example. The assignment plan is relayed in a semi-automated process to the individual facilities, in order to be implemented there on the facility by a person. It is also possible with an automated process controller to transmit the assignment plan to the particular facility, so that the production is executed automatically there.

In the following, the quant generation is illustrated on the basis of a simple example.

A material flow network is illustrated in FIG. 8, which specifies from which precursor and/or intermediate products the final products A and B are produced. The final product A is produced from the intermediate product U and the precursor product Z. The precursor products X and Y are necessary for producing the intermediate product U. The final product B is produced from the intermediate product V and the precursor product Y. The precursor products X and Z are necessary to produce the intermediate product V.

The precursor products X, Y, Z are produced on a facility VP, the intermediate products U, V on a facility ZP, and the final products A, B on a facility EP.

The material factors for each material flow are specified in FIG. 8 on the connection arrows. It is assumed as preset values that the precursor product x has a quant size of 10 quantity units and the precursor product Y also has a quant size of 10 quantity units. The precursor product Z has a quant size of 5 quantity units. The intermediate product may only be produced in a quant size of 5 quantity units, and the intermediate product V may only be produced in a quant size of 7 quantity units. The final products A and B may be produced in a quant size of 1 quantity unit.

The prognosis quantities are each to exist at the end of the periods, i.e., the deadline is the end of the prognosis period. At the end of each planning period, the target inventories are also to be maintained and therefore are to have been produced. The target inventories for the final products A and B are to contain 5 days range. There are starting inventories for both final products A and B as shown in the following table. The values of the prognoses and target inventories may also be taken from the following table.

| Name | End of period | Starting inventory | Prognosis | Target inventory |
|---|---|---|---|---|
| Final product A | Jan. 01, 2003 | 20.00 QU | | 45.45 QU |
| Final product A | Jan. 12, 2003 | | 100.00 QU | 35.71 QU |
| Final product A | Jan. 19, 2003 | | 50.00 QU | 142.86 QU |
| Final product A | Jan. 26, 2003 | | 200.00 QU | 0.00 QU |
| Final product B | Jan. 01, 2003 | 30.00 QU | | 22.73 QU |
| Final product B | Jan. 12, 2003 | | 50.00 QU | 142.86 QU |
| Final product B | Jan. 19, 2003 | | 200.00 QU | 71.43 QU |
| Final product B | Jan. 26, 2003 | | 100.00 QU | 0.00 QU |

The target inventory is calculated as follows:

$$\text{Target inventory} = \text{range}/(\text{distance to closest end of period}) * \text{prognosis quantity}$$

E.g.: 5 days range/11 days to closest end of period*100 QU=45.45 QU 5 days range/7 days to closest end of period*50 QU=35.71 QU It may be inferred from the Gantt chart shown in FIG. 9 that after completion of the quant generation, 4 quants of the final product A (yellow bar) and 3 quants of the final product B (blue bar) have been produced. Since 3 periods with demand were defined for each product (see also preceding table), 3 quants were also generated for each final product. Since, however, the starting inventory of product A is lower than the target inventory at the beginning of planning, a fourth quant of product A is generated. From the inventory graph for the product A, it may be inferred that the target inventory is subsequently reached.

For production of the final product A, it is necessary to produce the precursor product X. The first quant of the final product A has a quant size of 26 quantity units (target inventory−starting inventory in the period observed). In order to produce 26 quantities of A, according to the material factor, 7.8 quantity units (0.3×26) of the precursor product U must be produced. Since the minimum batch size of U is 5 quantity units, a quant of 10 quantity units must be produced. The remaining 2.2 quantity units then go into the next quant of product A.

Furthermore, in accordance with the material factor, 26 QU of the precursor product Z are necessary for the production of 26 QU of the product A. This results from the material factor 1. The quant of Z has a quantity of 6×5=30 and provides 26 of these for the production of product A and the remaining 4 QU of the product Z are taken into consideration for the next quant.

The intermediate product U is produced at a facility ZP. In order to produce 10 QU of U, at the material factor of 1.0, 1 QU of product X and 15 QU of product Y must be provided. Since the batch sizes of the precursor products x and Y are each 10 QU, 10 QU of product X and 20 QU of product Y must be produced. The remaining quantities then go into the subsequent quant as free quantities.

The quants are determined in the same way for the production of the final product B.

For the production of the final product B, it is necessary to produce the precursor product Y. No quant must be generated to provide the first target inventory, since the target inventory is greater than the starting inventory. A quantity of 7 quantity units remains as the stored inventory. For the next period observed, 136 (=143−7) quantity units of the final product B (target inventory—still remaining stored inventory) must be produced. In order to produce 136 quantities of B, in accordance with the material factor, 136 quantity units (1×136) of the precursor product Y must be produced. Since the minimum batch size of Y is 10 quantity units, a quant of 140 quantity units must be produced. The remaining 4 quantity units then go into the next quant of product B.

Furthermore, according to the material factor, 0.5*136=68 QU of the precursor product V are necessary for the production of 136 QU of the product B. This results from the material factor 0.5. The quant of V has a quantity of 10×7=70 and provides 68 QU of these for the production of the product B and the remaining 2 QU of the product V are taken into consideration for the next quant.

The intermediate product V is produced at a facility ZP. In order to produce 70 QU of V, at the material factor of 3, 210 QU of product X and 35 QU of product Z must be provided. Since the batch size of the precursor product X is 10 QU and that of the precursor product Y is 5 QU, the calculated quantities do not have to be changed. Therefore, no free quantities remain.

The inventory graph for the final products A, B is shown in FIG. 10. The reduction of the inventory because of the prognosticated sales and the increase because of the quantities produced by the quants may be seen. The connection arrows indicate the dependencies between precursor, intermediate, and final products. In addition, the target inventories established from the prognosis quantities are entered.

It is within the scope of the present invention that the method described herein is also used as an optimization method of a production process in the field of pharmaceutical active ingredient synthesis.

The features of the present invention disclosed in the preceding description, the claims, and the drawing may be essential both individually and in any arbitrary combination for implementing the present invention in its various embodiments.

The invention claimed is:

1. A method for optimizing a production process having starting products, intermediate products, and at least one final product, having the steps of quant generation and optimization,
wherein a feasible production plan for performing and/or controlling the production process is obtained as a result of the method,
the feasible production plan is established from the following starting variables:
target inventory quantities of the at least one final product for a period, and
a material flow network, in which one or more production steps are each describable by one or more precursor products and one or more successor products and linkages between production steps are describable through precursor and successor products and through material factors;
in the step of quant generation, a product flow network is run through starting from a target inventory quantity of the at least one final product and a last process step in time via individual process steps up to a first process step in time,
one or more quants are generated for each existing demand for a successor product of a production step, a quant is determined by a product, a period, and a process step,
demands for precursor products are predetermined in accordance with the product flow network are established from the target inventory quantity of the product corresponding to the quant for each quant generated,
a quant network is formed by connecting the quants through material flows, and
the step of optimization implements individual quants in a feasible production plan by assigning individual production steps to one or more resources and ordering them in a temporal sequence.

2. The method according to claim 1,
wherein production-dependent lot sizes of the at least one final product and intermediate products and integrity restrictions are provided for the production steps, after each determination of the demand for the particular precursor product of the particular quant, the demand determined for the precursor product being checked in order to tailor the demand determined to the production-dependent lot sizes and/or to integrity restrictions.

3. The method according to claims 1 or 2 wherein the material factors correspond to a proportion of a precursor product in a successor product of a particular production step.

4. The method according to claim 2,
wherein the checking of a particular demand established in regard to production-dependent lot sizes and/or integrity restrictions is performed by rounding to a predetermined minimum size.

5. The method according to claim 4,
wherein the feasible plan includes information about times, particularly start times and end times of production changes, and production steps, as well as assignments of a process to at least one resource.

6. The method according to claim 5,
wherein a target inventory is established from prognosis quantities of final products for a period and from a predetermined period of deliverability without further production.

7. The method according to claim 6,
wherein the step of optimization is performed with aid of an optimization method supported by a branch and bound principle.

8. The method according claim 7,
wherein the feasible production plan is implemented in a resource assignment plan, time, particularly start and end times of production change and production steps, and quantity of production on a resource being established.

9. A digital storage medium, particularly a CD-ROM, having electronically readable control signals, which may work together with a programmable computer system in such a way that a method according to claims 1 or 2 is executed.

10. A computer program product having programmed code stored on a machine-readable carrier for executing the method according to claims 1 or 2 on a programmable computer system.

11. A computer system for optimizing a production process having starting products, intermediate products, and at least one final product,
   wherein a quant generation unit and an optimization unit are provided,
   a control unit is provided in order to use a feasible production plan established by the quant generation unit and the optimization unit to control the production process,
   the feasible production plan established in the quant generation unit and in the optimization unit from the following starting variables:
      target inventory quantities of at least one final product for a period, and
      a material flow network, in which one or more production steps are each describable by one or more precursor products and one or more successor products and linkages between production steps are describable through precursor and successor products and through material factors;
   the quant generation unit is designed in order to run through a product flow network starting from a target inventory quantity of at least one final product and a last process step in time via individual process steps up to a first process step in time and to generate one or more quants for each existing demand for a successor product of a production step,
   a quant is determined by a product, a period, and a process step,
   the quant generation unit is also designed in order to establish demands for the precursor products predetermined in accordance with the product flow network from a target inventory quantity of a product corresponding to the quant for each quant generated and to form a quant network by connecting the quants through material flows,
   the optimization unit is designed in order to implement individual quants in a feasible production plan by ordering individual production steps in a temporal sequence and assigning them to at least one resource.

* * * * *